(12) United States Patent
Romijn

(10) Patent No.: US 6,612,096 B1
(45) Date of Patent: Sep. 2, 2003

(54) APPARATUS FOR CLOSING PACKAGES MADE FROM A HEAT-SEALABLE MATERIAL

(75) Inventor: Barend Bastiaan Romijn, Weert (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/647,595

(22) PCT Filed: Feb. 2, 2000

(86) PCT No.: PCT/DE00/00322

§ 371 (c)(1),
(2), (4) Date: Nov. 9, 2000

(87) PCT Pub. No.: WO00/46012

PCT Pub. Date: Aug. 10, 2000

(30) Foreign Application Priority Data

Feb. 3, 1999 (DE) .......................................... 199 04 154

(51) Int. Cl.⁷ ............................................. B65B 51/10
(52) U.S. Cl. ..................... 53/374.2; 53/373.2; 53/551; 53/552
(58) Field of Search ................ 53/552, 374.2, 53/371.2, 374.8, 551, 373.2

(56) References Cited

U.S. PATENT DOCUMENTS

| | | | | |
|---|---|---|---|---|
| 3,874,976 A | * | 4/1975 | MacFarland, Jr. ............ 156/251 |
| 4,444,614 A | * | 4/1984 | Krayer ...................... 156/580.2 |
| 4,630,429 A | * | 12/1986 | Christine ..................... 156/515 |
| 4,768,326 A | * | 9/1988 | Kovacs ...................... 156/583.3 |
| 5,067,302 A | * | 11/1991 | Boeckmann ................. 53/374.2 |
| 5,207,049 A | * | 5/1993 | Baruffato et al. ......... 156/583.1 |
| 5,247,779 A | * | 9/1993 | Wirsig et al. ............... 53/373.7 |
| D366,995 S | * | 2/1996 | Davis ......................... D15/146 |
| 5,638,662 A | * | 6/1997 | Alhamad ..................... 206/591 |
| 5,682,732 A | * | 11/1997 | Selberg ....................... 219/243 |
| 5,787,690 A | * | 8/1998 | Konno ......................... 53/373.7 |
| 5,868,901 A | * | 2/1999 | Smith .......................... 156/515 |
| 5,937,615 A | * | 8/1999 | Forman ....................... 493/213 |

FOREIGN PATENT DOCUMENTS

| DE | 4420808 | * | 12/1995 | ........... B31B/23/60 |
|---|---|---|---|---|
| EP | 0730946 | * | 9/1996 | ........... B29C/65/02 |

* cited by examiner

Primary Examiner—Rinaldi I. Rada
Assistant Examiner—Louis Tran
(74) Attorney, Agent, or Firm—Ronald E. Greigg

(57) ABSTRACT

An apparatus for closing packages made from a heat-sealable material has sealing jaws, which are subdivided by a recess or by slits into two zones. What is essential is that the two zones are eastically joined together by means of a connecting web, so that when a transverse seam is sealed, it is possible to compensate for a different number of layers of packaging material along the transverse seam. The apparatus according to the invention is relatively simple in structure and makes high sealing qualities attainable.

26 Claims, 4 Drawing Sheets

APPARATUS FOR CLOSING PACKAGES MADE FROM A HEAT-SEALABLE MATERIAL

PRIOR ART

The invention relates to an apparatus for closing packages made from a heat-sealable material of the kind that is disclosed in U.S. Pat. No. 4,768,326. In the known apparatus, the recesses for the flexible sealing faces are disposed such that the flexibility of the sealing faces is the same over the entire height of the transverse seam of the package, and is greatest along the transverse seam in the region of the longitudinal seam of the package. To that end, an additional longitudinal slit is made in the sealing face, in the region of the longitudinal seam of the package. It is disadvantageous that in the region of the additional longitudinal slit, the sealing quality is critical because the sealing pressure there is slight.

From German Patent Disclosure DE 29 34 807 A1, it is also known, to compensate for different numbers of layers of packaging material, along a sealing seam of a bag package at the sealing jaw in the region of the sealing seam, to dispose a deformable heat transfer means, filled with a medium, which is surrounded by a covering. Such an apparatus is relatively complicated in structure because of the various components. From German Utility Model DE-GM 94 13 035, an apparatus is also known, in whose sealing jaws elongated silicone inlays are provided, to enable compensating for a different number of layers of packaging material along a sealing seam of a bag package. However, the use of silicone has the disadvantage that the thermal conductivity of silicone from the remaining region of the sealing jaws is highly variable, which results in problems in operation with regard to the sealing quality.

ADVANTAGES OF THE INVENTION

The apparatus according to the invention for closing packages made from a heat-sealable material, has the advantage over the prior art that with a simple structure, because additional add-on parts are dispensed with, especially well-sealed transverse seams are made possible, since different sealing pressures are attained both transversely and longitudinally of the transverse seam, in such a way that the sealing pressure adapts itself especially well to the different thicknesses of material.

Further advantageous refinements of the apparatus according to the invention for closing packages from a heat-sealable material will become apparent from the disclosure.

BRIEF DESCRIPTION OF THE DRAWINGS

Exemplary embodiments of the invention are shown in the drawings and will be described in further detail below. Shown are.

DESCRIPTION OF THE EXEMPLARY EMBODIMENTS

Figure 1:
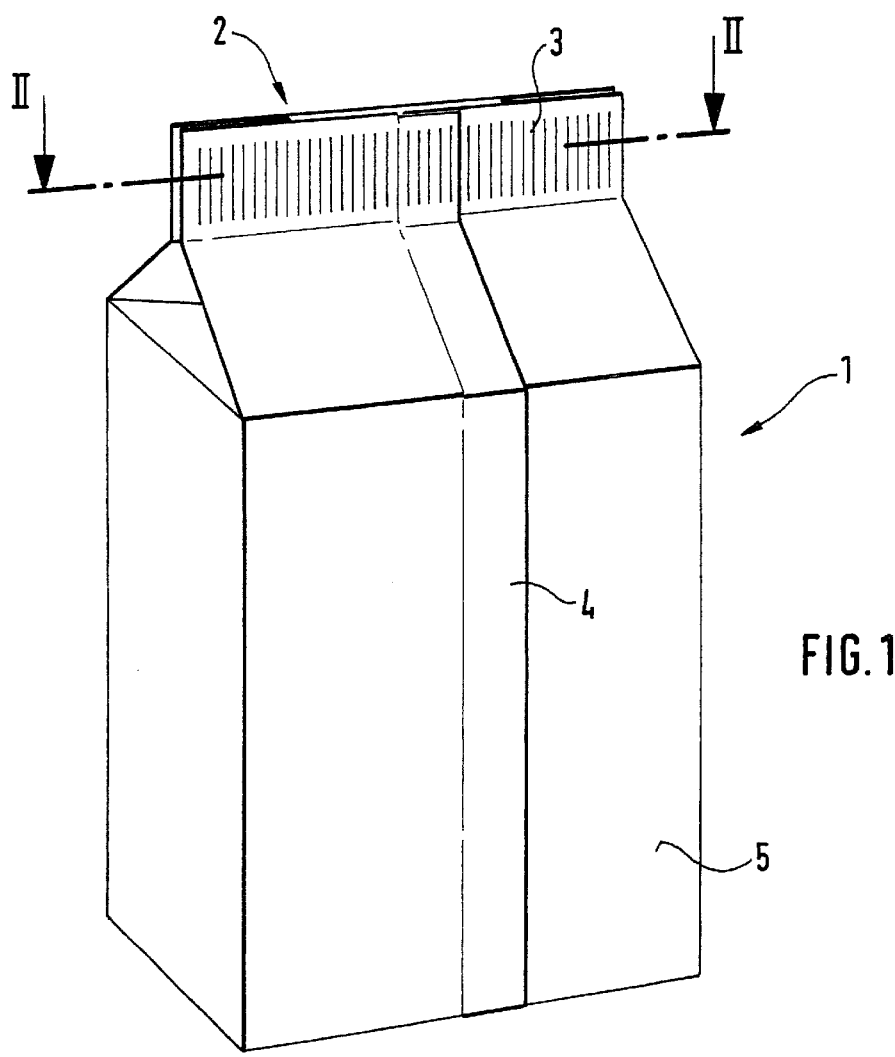
FIG. 1, a package in a perspective view.
Figure 2:
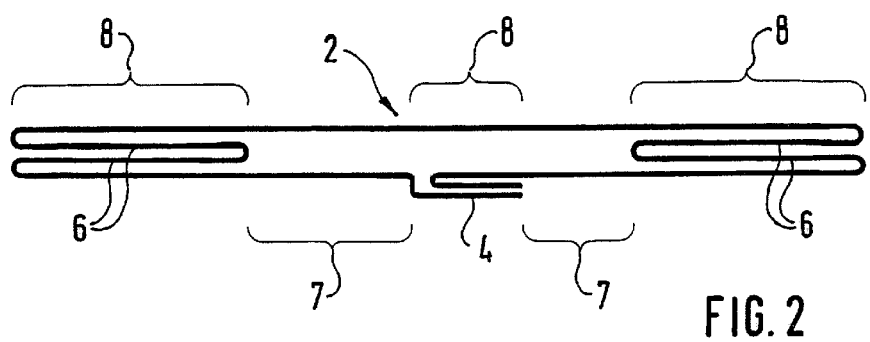
FIG. 2, a section in the plane II—II of FIG. 1.

In FIG. 1, a package in the form of a bag package 1 of substantially rectangular cross-sectional area is shown. The bag package 1, made in particular on a bag making machine from a heat-sealable packaging material, has a top closure 2 creased in finlike fashion, with a transverse sealing seam 3 and a longitudinal sealing seam 4, which extend over the entire front side 5 of the bag package 1 and its top closure 2 as well as the bottom region, not identified by reference numeral. As a result of folding of the top closure 2 with side creases 6 drawn in in the shape of V, and with the longitudinal sealing seam 4, the top closure 2 has one region 7 in which the packaging material is in two layers or plies, and one region 8 in which the packaging material is in four layers or plies (FIG. 2). Furthermore, the bottom region of the bag package 1, which is also transversely sealed, also has regions with different numbers of layers of packaging material.

Figure 3:
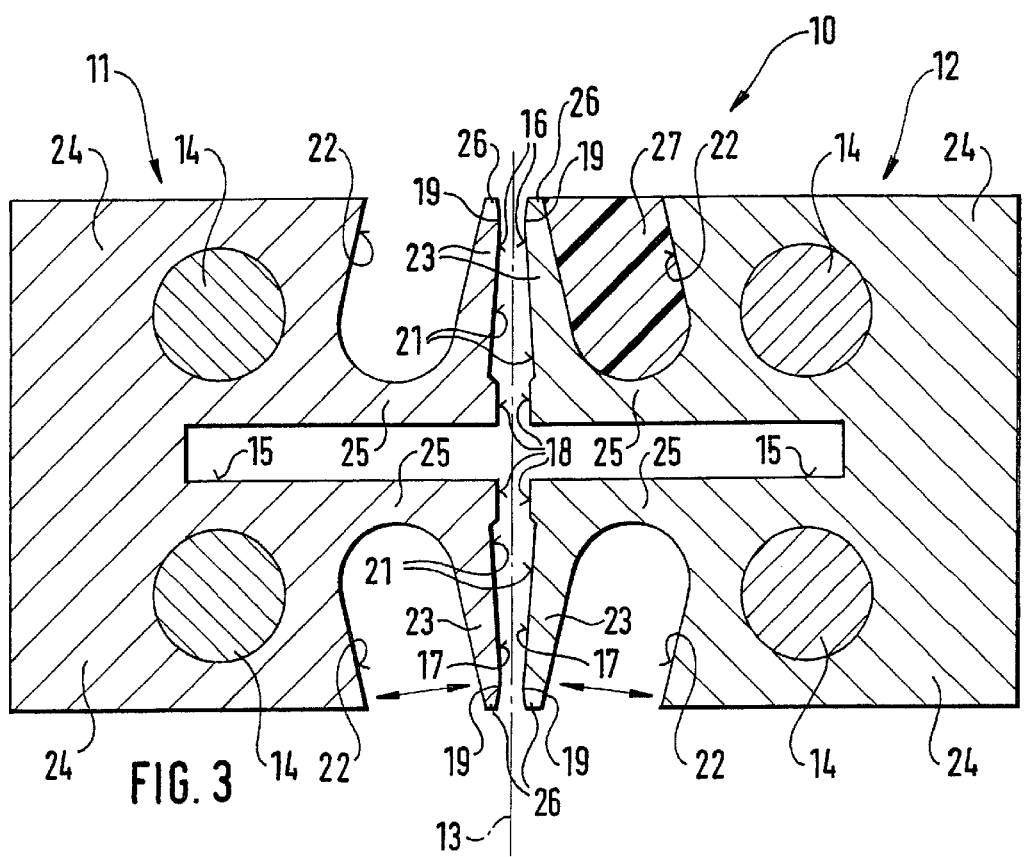
FIG. 3, a first apparatus according to the invention in cross section.

The apparatus 10 shown in FIG. 3 is used to form the transverse sealing seam 3. The apparatus 10 has two metal sealing jaws 11, 12, which can be moved symmetrically toward one another with respect to a sealing plane 13. A heating device in the form of one or more electrical heating bars 14 is disposed in each sealing jaw 11, 12. One recess 15 each is formed in the middle of each sealing jaw 11, 12, on the side toward the sealing plane 13, and a separating device in the form of a cutting knife, not shown, is disposed in each recess. The recess 15 partitions off an upper end face portion 16 from a lower end face portion 17 in each of the sealing jaws 11, 12. The upper end face portions 16 are used to form a bottom transverse seam for a bag package 1 that has not yet been filled, while by means of the two lower end face portions 17, the transverse sealing seam 3 of a bag package 1 that has already been filled is formed.

Two striplike sealing regions 18, 19, each for example about 3 mm wide, are formed on each of the end face portions 16, 17 and extend longitudinally of the transverse sealing seam 3 and bottom transverse seam to be formed. While one set of sealing regions 18 immediately adjoins the recesses 15, the other sealing regions 19 are located on the peripheral. regions, remote from the recess 15 of the end face portions 16, 17. Between the sealing regions 18, 19, in each end face portion 16, 17, one zone 21 is formed that is sunken in relation to the sealing regions 18, 19. What is essential is that the spacing between the facing sealing regions 18 of the two sealing jaws 11, 12 is greater, for instance by 0.4 mm, than the spacing of the other sealing regions 19 from one another.

Each of the sealing jaws 11, 12, near the end face portions 16, 17 on both sides of the recesses 15, has obliquely disposed recesses 22 extending to just before the recesses 15. Zones 23 of triangular cross section that carry the end face portions 16, 17 are formed by the recesses 22 and are integrally joined to the remaining zones 24 of the sealing jaws 11, 12, each by a respective connecting web 25. The regions of the zones 23 remote from the recesses 15, which zones have the sealing regions 19, are embodied as relatively thin webs 26.

It is understand that the recesses 22 could also be disposed parallel to the sealing regions 19, so that in that case the zones 23 would be not triangular but rather rectangular in cross section.

By decoupling the zones 23 from the zones 24 by means of the recesses 22 and by joining the zones 23 to the zones 24 via the connecting webs 25, it is attained that the zones 23 are joined elastically or flexibly via the connecting webs 25 to the zones 24.

Preferably, for the sake of better thermal coupling of the zones 23 to the zones 24, or to avoid soiling, the recesses 22 are filled with an elastic heat conducting agent 27.

In operation of the apparatus 10, with the sealing jaws 11, 12 spaced apart from one another, the prefolded top closure 2 and the also-prefolded bottom closure reach the space between the zones 23. For sealing the transverse sealing seam 3 and the bottom transverse seam, the two sealing jaws 11, 12, heated by means of the heating bars 14, are then moved toward one another. Because the sealing regions 19 oriented toward one another are spaced apart by a shorter distance than the sealing regions 19 facing toward one another, the sealing regions 19 come into contact with the packaging material first. Because of the flexibility both around the connecting webs 25 and along the webs 26, the sealing regions 19 in particular can adapt to a different number of packaging material layers in the regions 7 and 8 in such a way that in the two-ply regions 7, the sealing regions 19 exert a relatively high sealing pressure on the packaging material, or that relatively slight differences in sealing pressure prevail between the two-ply regions 7 and the four-ply regions 8. As a consequence, high-quality, homogeneous sealing seams can be made.

In addition it will be noted that in the sealing regions 18, the sealing pressure along the sealing seams, because of the disposition of the sealing regions in the extension of the connecting webs 25, is less uniform, and because of their greater spacing from one another (by comparison with the sealing regions 19) is less overall than in the sealing regions 19. However, this is not critical in the sense that the sealing seams formed by the sealing regions 19 are located in the peripheral regions of the bag package 1, which are relatively far away from the product in the package.

Figure 4:
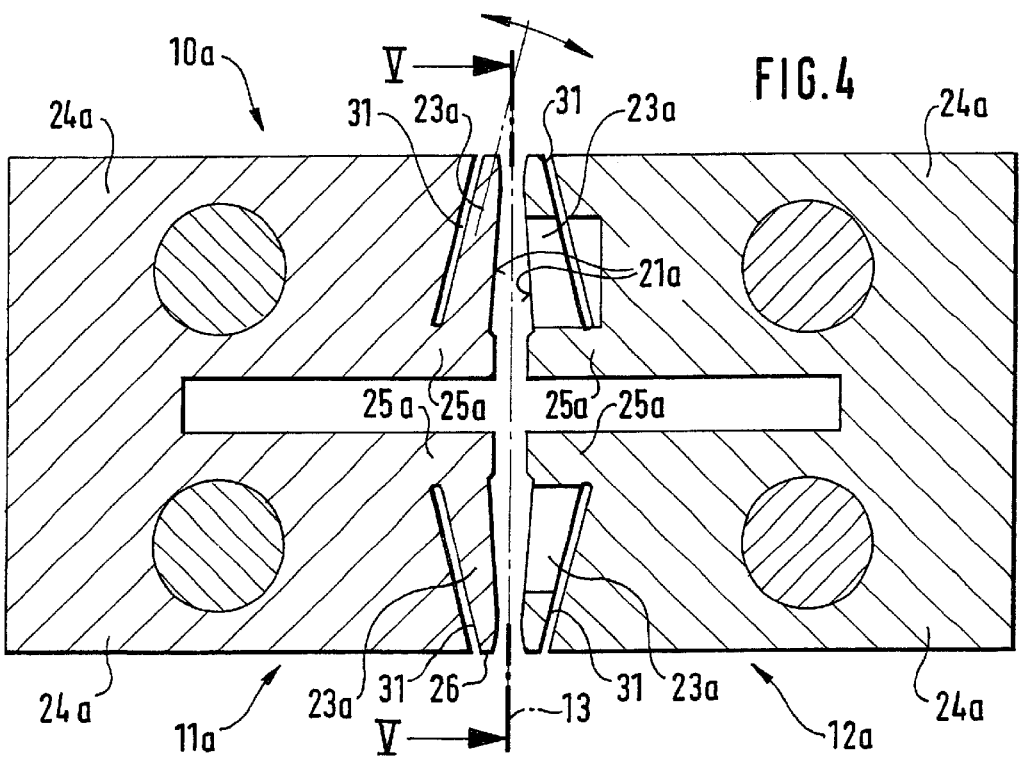
FIG. 4, a second apparatus according to the invention in cross section.
Figure 5:
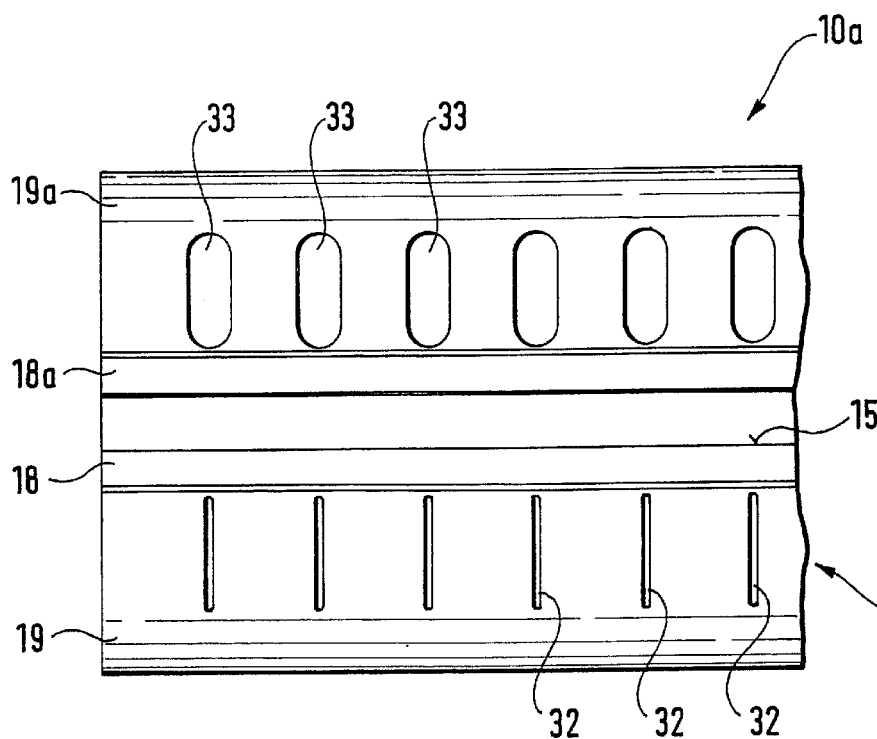
FIG. 5, an elevation view in the direction V—V of FIG. 4.

In the apparatus 10a in FIGS. 4 and 5, the recesses 22 are replaced by narrow slits 31, which can be made by erosion, for example. The slits 31 can extend obliquely to the sealing regions 18a, 19a, as shown, or parallel. The narrow slits 31 reduce the spring travel of the zones 23a about the connecting web 25a, so that in the event of an overload, the zones 23a are braced by the zones 24a. The thermal conduction is improved as well, so that a heat conducting means in the slits 31 can optionally be dispensed with. Furthermore, at least along the zones 23a in the sunken zone 21a, additional slits 32 or additional recesses 33 are provided. As a result, the flexibility of the sealing jaws 11a, 12a along the zones 23a can be further increased. In the case of the additional recesses 33, which are preferably made by milling, these recesses, for reasons dictated by production, extend into the zones 24a. The additional slits 32 and the additional recesses 33 can be combined with one another in the individual sealing jaws 11a, 12a; for example, additional slits 32 or additional recesses 33 may be embodied in only one sealing jaw 11a, 12a, while the other sealing jaw 11a, 12a does not have them. It is also possible for additional slits 32 and additional recesses 33 to be combined with one another in one sealing jaw 11a, 12a, as shown, or for the additional slits 32 and additional recesses 33 to be provided in the apparatus 10 instead.

Figure 6:
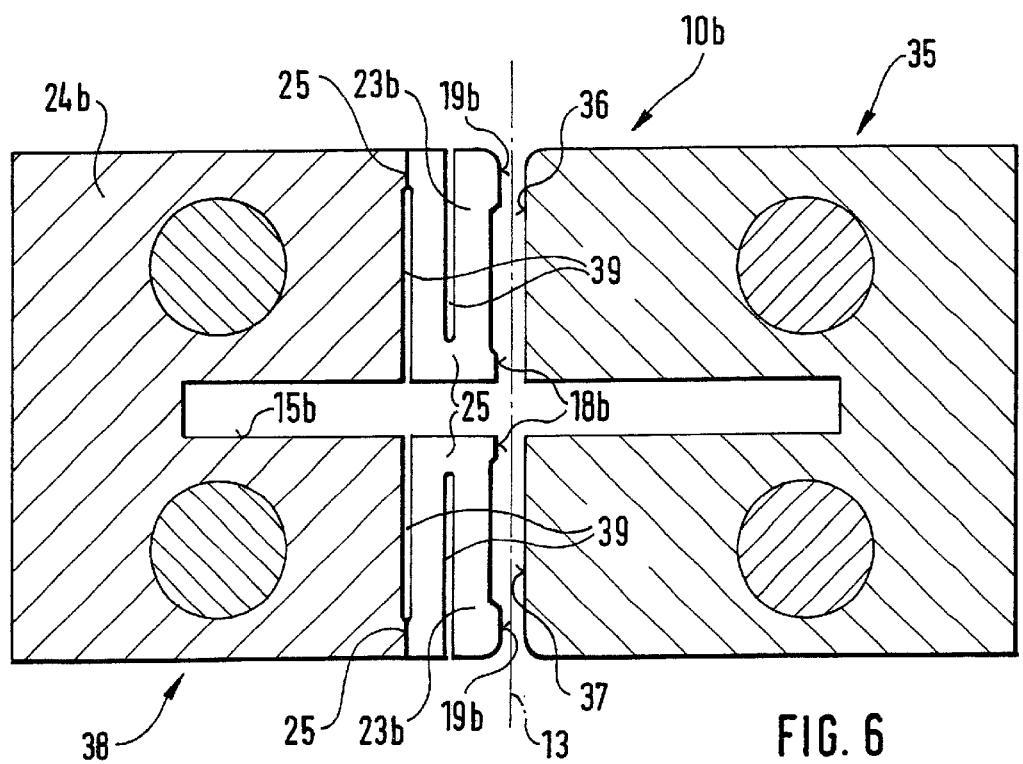
FIG. 6, a third apparatus according to the invention in cross section.

In the exemplary embodiment of FIG. 6, the apparatus 10b has one sealing jaw 35 with two flat sealing faces 36, 37 and one sealing jaw 38 with two zones 23b, each with heightened sealing regions 18b, 19b compared with the previous exemplary embodiments. What is essential is that the zones 23b are each subdivided by two slits 39 that are parallel to one another;

one slit 39 in each zone 23b begins at the recess 15b, while the other slit 39 begins on the outside, remote from the recess 15b, of the sealing jaw 38. In the apparatus 10b, a greater spring travel of the zones 23b can be attained, and furthermore, the sealing regions 18b are now equipped with a spring travel as well. It is understood that to further increase the flexibility, the additional slits 32 and additional recesses 33 described in conjunction with FIGS. 4 and 5 can be provided in the apparatus 10b as well. It is also conceivable for the sealing jaw 35 also to be embodied with slits 39, like the sealing jaw 38.

Figure 7:
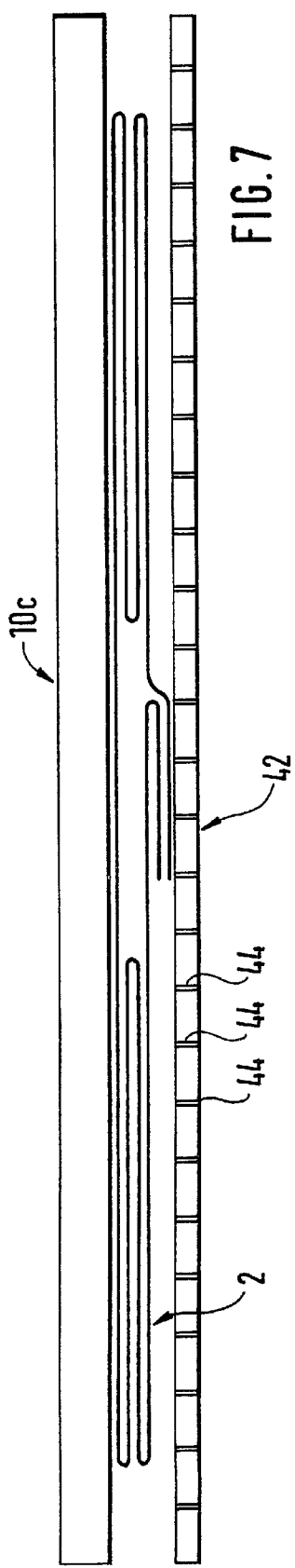
FIGS. 7–9, longitudinal sections through modified sealing jaws.
Figure 8:
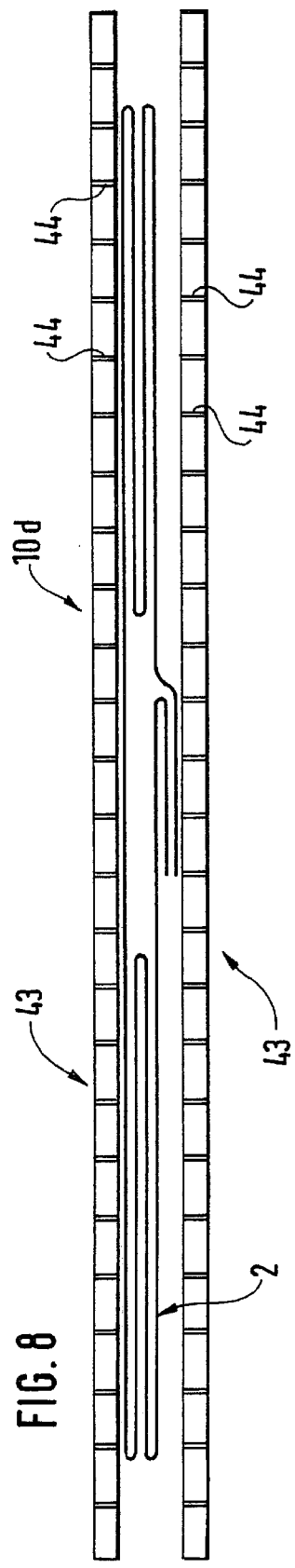
Figure 9:
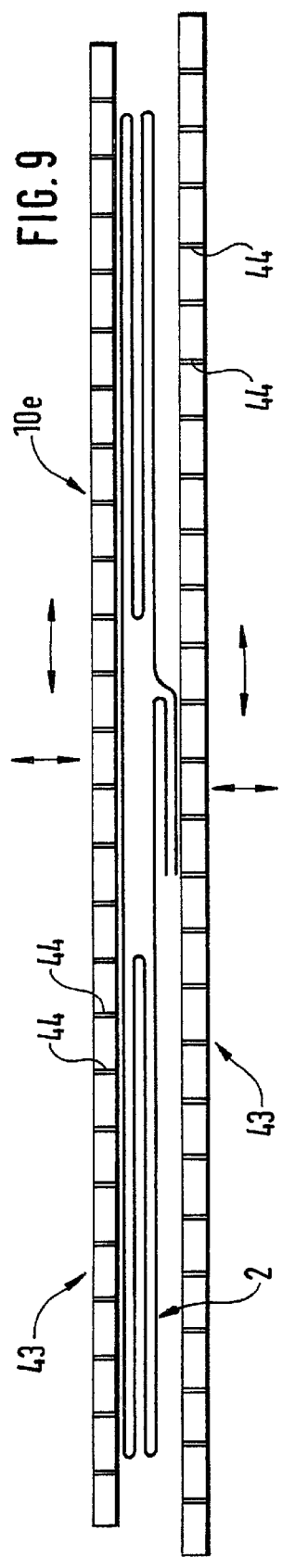

The exemplary embodiments described in FIGS. 1–6 can be modified by sealing jaws 42, 43 of the kind shown in FIGS. 7–9. There, the sealing jaws 42, 43 are each subdivided by longitudinal slits 44, which extend transversely to the transverse seams to be formed. In other words, this means that the sealing regions 18, 18a, 18b, 19, 19a, 19b are subdivided into a plurality of smaller sealing regions. In the apparatus 10c of FIG. 7, the longitudinal slits 44 are embodied on only one sealing jaw 42. In FIGS. 8 and 9, by comparison, the longitudinal slits 44 are embodied on both sealing jaws 43 of each of the apparatuses 10d and 10e; in the sealing jaws 43 of the apparatus 10d, the longitudinal slits 44 are each aligned with one another, while in the apparatus 10e, the longitudinal slits 44 in the two sealing jaws 43 are each offset from one another by one-half the pitch. By means of the longitudinal slits 44, the flexibility of the sealing jaws 43 is additionally increased, to compensate for a different number of layers of packaging material along the sealing seams.

The foregoing relates to a preferred exemplary embodiments of the invention, it being understood that other variants and embodiments are thereof possible within the spirit and scope of the invention, the latter being defined by the appended claims.

What is claimed is:

1. An apparatus (10; 10a–10e) for closing packages (1) made from a heat-sealable material, comprising two opposed sealing jaws (11, 12; 11a, 12a; 35, 38; 42; 43) having end faces (16, 17) formed with opposed sealing faces (18, 19; 18a, 19a; 18b, 19b) disposed parallel to one another and movable toward one another for forming transverse seams (3) of said packages in a region of said sealing faces, in which at least one sealing face (19; 19a; 19b) is embodied flexibly in order to compensate for different thicknesses of material of the package (1) along the transverse seams (3), said flex provided by means of a slit recess (22;31;39) in the sealing jaw (11;12;11a;12a;35;38;42;43) disposed behind said at least one sealing face (19;19a;19b), at least one sealing jaw (11, 12; 11a, 12a; 35, 38; 42; 43) has said one sealing face and a second sealing face (18; 18a; 18b), separated from one another by an intermediate zone (21), which extend along the transverse seam (3); and that said one sealing face (19; 19a; 19b) has a lesser spacing from its opposed sealing face (19; 19a; 36) than the said second sealing face (18; 18a) has from its opposed sealing face, so that when the two sealing jaws (11, 12; 11a, 12a; 35, 38; 42; 43) are moved together, said one sealing face (19; 19a; 19b) is elastically deformed in the forming of the transverse seam (3).

2. The apparatus of claim 1, in which each sealing jaw (11, 12; 11a, 12a; 35, 38; 42; 43) has a recess (15) for a separating device, and that the sealing faces (18, 19; 18a, 19*a*; 19*b*, 35) are each disposed on both sides of the recesses (15) for the separating device.

3. The apparatus of claim 1, in which said slit recess (22; 31; 39) separates one region (23; 23*a*; 23*b*) of the sealing jaw (11, 12; 11*a*, 12*a*; 35, 38; 42; 43) that carries the sealing faces (18, 19; 18*a*, 19*a*; 18*b*, 19*b*) from a remaining region (24; 24*a*; 24*b*) of the sealing jaw (11, 12; 11*a*, 12*a*; 35, 38; 42; 43), and that the two regions (23, 24; 23*a*, 24*a*; 23*b*, 24*b*) are connected to one another by means of a connecting web (25; 25*a*).

4. The apparatus of claim 2, in which said slit recess (22; 31; 39) separates one region (23; 23*a*; 23*b*) of the sealing jaw (11, 12; 11*a*, 12*a*; 35, 38; 42; 43) that carries the sealing faces (18, 19; 18*a*, 19*a*; 18*b*, 19*b*) from a remaining region (24; 24*a*; 24*b*) of the sealing jaw (11, 12; 11*a*, 12*a*; 35, 38; 42; 43), and that the two regions (23, 24; 23*a*, 24*a*; 23*b*, 24*b*) are connected to one another by means of a connecting web (25; 25*a*).

5. The apparatus of claim 3, in which said one sealing face (19; 19*b*) is disposed on the end face (16, 17), on a side remote from the connecting web (25; 25*a*), and is embodied in strip form.

6. The apparatus of claim 4, in which said one sealing face (19; 19*b*) is disposed on the end face (16, 17), on a side remote from the connecting web (25; 25*a*), and is embodied in strip form.

7. The apparatus of claim 3, in which said slit recess (22; 31) is disposed obliquely to the end face of the sealing jaw, so that one region of the sealing jaw (23; 23*a*) is triangular in cross section, and said one sealing face (19) is disposed in the narrowest part of said one region (23; 23*a*).

8. The apparatus of claim 4, in which said slit recess (22; 31) is disposed obliquely to the end face of the sealing jaw, so that one region of the sealing jaw (23; 23*a*) is triangular in cross section, and said one sealing face (19) is disposed in the narrowest part of said one region (23; 23*a*).

9. The apparatus of claim 1, in which additional recesses (32, 33) extending perpendicular to the sealing face (18, 19; 18*b*, 19*b*) are embodied in the intermediate zone (21; 21*a*).

10. The apparatus of claim 2, in which additional recesses (32, 33) extending perpendicular to the sealing face (18, 19; 18*b*, 19*b*) are embodied in the intermediate zone (21; 21*a*).

11. The apparatus of claim 3, in which additional recesses (32, 33) extending perpendicular to the sealing face (18, 19; 18*b*, 19*b*) are embodied in the intermediate zone (21; 21*a*).

12. The apparatus of claim 5, in which additional recesses (32, 33) extending perpendicular to the sealing face (18, 19; 18*b*, 19*b*) are embodied in the intermediate zone (21; 21*a*).

13. The apparatus of claim 7, in which additional recesses (32, 33) extending perpendicular to the sealing face (18, 19; 18*b*, 19*b*) are embodied in the intermediate zone (21; 21*a*).

14. The apparatus of claim 1, in which a region (23; 23*a*; 23*b*) of the sealing jaw that carries the sealing faces is subdivided by slits (44) extending transversely to the sealing face (18, 19; 18*b*, 19*b*).

15. The apparatus of claim 2, in which a region (23; 23*a*; 23*b*) of the sealing jaw that carries the sealing faces is subdivided by slits (44) extending transversely to the sealing face (18, 19; 18*b*, 19*b*).

16. The apparatus of claim 3, in which said one region (23; 23*a*; 23*b*) is subdivided by slits (44) extending transversely to the sealing face (18, 19; 18*b*, 19*b*).

17. The apparatus of claim 5, in which said one region (23; 23*a*; 23*b*) is subdivided by slits (44) extending transversely to the sealing face (18, 19; 18*b*, 19*b*).

18. The apparatus of claim 7, in which said one region (23; 23*a*; 23*b*) is subdivided by slits (44) extending transversely to the sealing face (18, 19; 18*b*, 19*b*).

19. The apparatus of claim 9, in which a region (23; 23*a*; 23*b*) of the sealing jaw that carries the sealing faces is subdivided by slits (44) extending transversely to the sealing face (18, 19; 18*b*, 19*b*).

20. The apparatus of claim 1, in which said slit recess (22) is filled with an elastic thermal heat coupling agent (27).

21. The apparatus of claim 2, in which said slit recess (22) is filled with an elastic thermal heat coupling agent (27).

22. The apparatus of claim 3, in which said silt recess (22) is filled with an elastic thermal heat coupling agent (27).

23. The apparatus of claim 5, in which said slit recess (22) is filled with an elastic thermal heat coupling agent (27).

24. The apparatus of claim 7, in which said slit recess (22) is filled with an elastic thermal heat coupling agent (27).

25. The apparatus of claim 9, in which said slit recess (22) is filled with an elastic thermal heat coupling agent (27).

26. The apparatus of claim 14, in which said slit recess (22) is filled with an elastic thermal heat coupling agent (27).

\* \* \* \* \*